United States Patent Office 2,743,260
Patented Apr. 24, 1956

2,743,260
POLYMERIC METHYLOL MALEIMIDE AND DERIVATIVES

Pliny O. Tawney, Passaic, N. J., assignor to United States Rubber Company, New York, N. Y., a corporation of New Jersey No Drawing. Application May 25, 1953,
Serial No. 357,341

7 Claims. (Cl. 260—78)

This invention relates to improvements in polymerizable chemicals, their preparation and use.

An object of the invention is to provide certain new monomeric maleimidomethyl

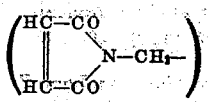

compounds. Another object is to provide new resinous polymerizates, especially resinous heteropolymers, produced from maleimidomethyl compounds. Further objects will be apparent from the hereinafter description.

The novel chemicals referred to subscribe to the formula

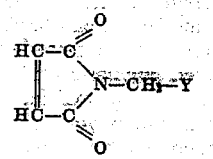

where Y represents a thiocyano, carbamyloxy, or alkyl-amino radical.

These novel compounds can be prepared by a metathetical reaction between a suitable compound containing the radical Y and a suitable compound of the formula

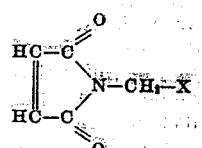

where X is either hydroxyl, chlorine or bromine. In the preparation of products in which Y is an amino radical, the starting reagent optionally can be maleimide itself and the co-reactant therewith a compound containing an aminomethyl radical, exemplified by piperidylmethyl ethyl ether, diethylaminomethyl ethyl ether, and di-n-butylaminomethyl ethyl ether; that is, the methylene group which appears in the final product can be supplied either by the amino reagent or by the maleimido reactant.

I have discovered that the maleimidomethyl chemicals having the "Y" character, as well as those having the "X" character, can be used to produce new resinous products, especially resinous products which are heteropolymers of such monomeric chemicals with other monomeric ethylenic compounds having a terminal ethylenic group, $CH_2=C<$, which is non-conjugated with respect to any other ethylenic group that may be present.

The heteropolymers, like the homopolymers, are valuable for providing polymeric resins useful in making molded articles, and as varnish bases for making varnishes which as dried films are hard, clear, heat-resistant and mar-resistant.

Polystyrene is extensively used in making clear, molded articles. However, these articles are rather brittle and easily broken at room temperature. Also, they are thermoplastic, and hence subject to distortion, at temperatures well below 100° C.

A further object of this invention, therefore, is to provide heteropolymers which are not only superior to polystyrene in these properties, but which, unlike those derived from maleimide, N-alkylmaleimide and N-cycloalkylmaleimide (U. S. Patent No. 2,342,295), are thermosettable to the insoluble, infusible state. The difference resides in the fact that the present maleimido compounds, including such as N-methylolmaleimide, N-chloromethylmaleimide, and the maleimidomethyl amines, are trifunctional monomers by reason of the ethylenic group and the X or Y substituent, and therefore can operate to provide the cross-links which are required for achieving insolubility and infusibility in coatings and castings. For example, films prepared by baking a filmed viscous solution in dimethyl formamide (5% solids) of a copolymer of N-methylmaleimide and styrene (50:50 feed), although hard, were readily soluble in dioxane, whereas, by comparison, a similarly prepared, and baked, film of a copolymer of N-methylolmaleimide and styrene, did not dissolve in the dioxane. Similarly, a copolymer of styrene and N-methylolmaleimide (feed ratio 4:1) retains the clarity of polystyrene, but after heat treatment it becomes harder and less brittle than polystyrene, is substantially insoluble in common organic solvents, and is resistant to distortion at much higher temperatures than is styrene.

This crosslinking ability of the groups X and Y is surprising. Normally, compounds having the structure $>N-(CH_2)_nX$ or $>N-(CH_2)_nY$ where $n$ is at least 2, do not split off X or Y to give a radical capable of cross-linking. The compounds used in this invention, i. e., compounds containing a methylene bridge between the ring nitrogen and the group X or Y, are thus seen to be unique.

The new monomeric compounds can be made from one or another of the compounds N-methylolmaleimide, N-(chloromethyl)maleimide, and maleimide by metathetical reaction with a suitable compound which furnishes the group Y. N-(bromomethyl)maleimide may, if desired, be used in place of the corresponding chloro compound.

Representative of said reactions are the following:

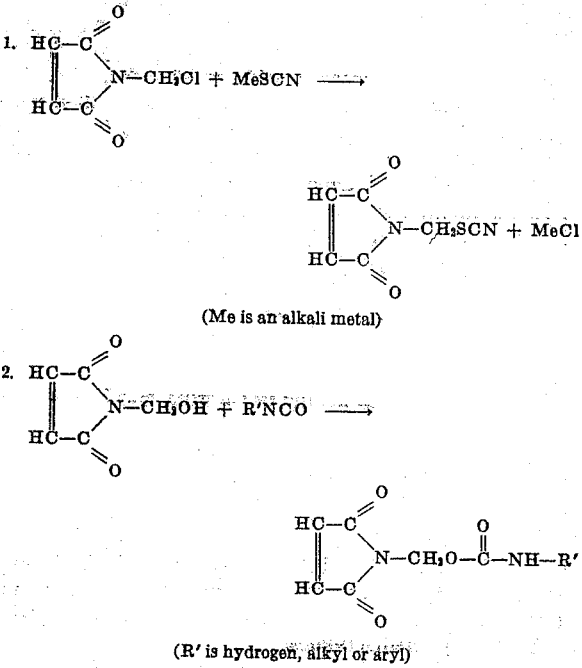

(Me is an alkali metal)

(R' is hydrogen, alkyl or aryl)

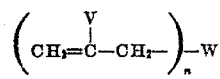

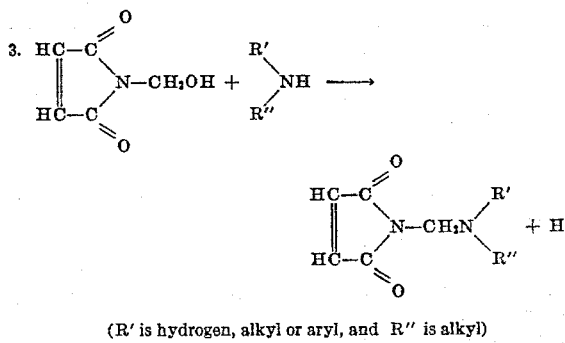

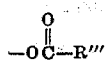

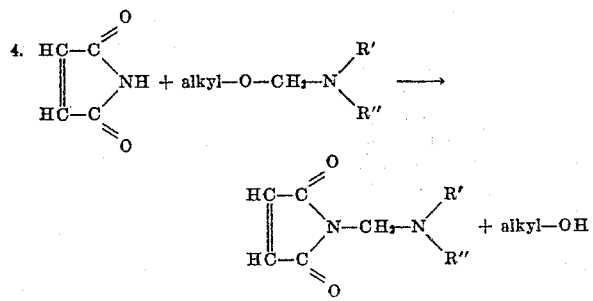

(R′ is hydrogen, alkyl or aryl, and R″ is alkyl)

4. 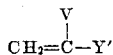

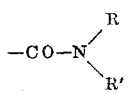

As a general rule, when the X reagent is an alkali metal compound, the maleimidomethyl reagent should be the N-(chloromethyl) maleimide, as will be apparent to those skilled in the art.

The maleimidomethyl chemicals may be interpolymerized with 1-ethylenic ($CH_2=C<$) compounds, to form useful resins whose properties can be varied widely to fit various desired uses by suitably varying the comonomer or comonomers both in type and amount. The new monomers can be so interpolymerized in a wide range of ratios; e. g., as little as 1% of maleimidomethyl compound may become combined with 99%, by weight, of the comonomer. It is usually preferred to have at least about 5% of the maleimidomethyl compound in the mixture of comonomers, in order to effect a material improvement in the properties of the heteropolymer over those of the homopolymers of the copolymerizable vinyl compound.

Among such copolymerizable ethylenic, or vinyl, compounds are the following: styrene; alpha-, ortho, meta-, and para-methylstyrenes; the divinylbenzenes; the acrylic-type nitriles, amides, acids and esters; the allylic-type carboxylic esters and alcohols; the monovinylpyridines; the vinyl esters of halogen acids or of carboxylic acids; vinylidene chloride; the alkyl vinyl ethers; the alkyl vinyl ketones, the alkyl isopropenyl ketones; the isopropenyl carboxylic esters, e. g., isopropenyl acetate; and the olefin and non-conjugated diolefin hydrocarbons containing a terminal methylene group, e. g., octene-1, isobutylene, diisobutylene and dimethallyl.

The usable acrylic-type compounds are those having the structure $$CH_2=\overset{V}{C}-Y'$$

where V is hydrogen, methyl or chlorine, and Y′ is —CN, $$-CO-N\overset{R}{\underset{R'}{\diagdown}}$$

or —COOR, and R and R′ are hydrogen, alkyl, alkenyl, cycloalkyl, aralkyl or aryl. The most important monomers of this type are acrylonitrile, the alkyl acrylates and the alkyl methacrylates.

The usable allylic-type esters and alcohols are those having the structure $$\left(CH_2=\overset{V}{C}-CH_2-\right)_n-W$$

where V is defined as in the preceding paragraph, n is an integer which is one or two, and W is —OH or $$-O\overset{O}{\underset{\|}{C}}-R'''$$

when n is one (R′″ being an alkyl, alkenyl, cycloalkyl, aryl, or aralkyl group), and W is the diacid residue of a dibasic acid when n is two. Important monomers of this class are allyl acetate, dimethallyl succinate and diallyl phthalate.

The usable monovinylpyridines are the unsubstituted vinylpyridines, viz., the 2-, 3- and 4-vinylpyridines; and the alkyl-substituted vinylpyridines, e. g., 2-methyl-5-vinylpyridine, 5-ethyl-2-vinylpyridine, 2-methyl-6-vinylpyridine and 2-ethyl-4-vinylpyridine.

The vinyl esters have the structure $CH_2=CH-A$, where A is a chlorine or acyloxy radical. The most important monomers of this group are vinyl chloride and vinyl acetate.

Herein the word "heteropolymer" is used to cover copolymers of any single maleimidomethyl compound with any single ethylenic ($CH_2=C<$) comonomer, copolymers of two or more maleimidomethyl compounds with one or more of the ethylenic compounds, and copolymers of a single maleimidomethyl compound with two or more of the ethylenic compounds.

These heteropolymers, after partial polymerization to form soluble polymerizates, can be further interpolymerized with other unsaturated materials, e. g., with alkyd resins of unsaturated polybasic acids such as maleic acid and fumaric acid; and with maleic, fumaric and methylenemalonic esters of monohydric alcohols.

The new heteropolymers are made in the presence of a catalyst which generates free radicals. Typical of such polymerization catalysts are the organic hydroperoxides and peroxides, the peroxysulfates, and the decomposable azo compounds, e. g., N,N′-azobis-(alpha-isobutyronitrile) (Porofor N). Among the most useful peroxidic catalysts are benzoyl peroxide, acetyl peroxide, tert.-butyl perbenzoate, di-tert.-butyl peroxide, and tert.-butyl hydroperoxide. The choice of catalyst will depend upon the temperature at which it is convenient to carry out the polymerization. For example, acetyl peroxide usually is employed at temperatures below 50° C., benzoyl peroxide at about 60–80° C., and di-tert.-butyl peroxide at 125–135° C. However, the temperature is a matter of choice, and may be varied widely.

The temperature for the polymerization reaction is selected in accordance with the temperature at which the catalyst decomposes to give free radicals at a useful rate, and, if soluble and fusible polymers are desired, the temperature is kept below that at which the polymers are convertible to the infusible, insoluble condition. The heteropolymers may be made in the mass or oil phase, either with or without a suitable organic solvent; they can also be made by known aqueous-emulsion techniques.

The following examples are given to illustrate the preparation of typical new maleimidomethyl chemicals, and resins derived from them as well as from those having the X connotation, it being understood that the invention is not confined thereto; parts are by weight.

Examples 1 to 7 are concerned with the preparation of typical new maleimidomethyl compounds of my invention.

*Example 1*

To a solution of 20 parts of N-(chloromethyl)-maleimide in 60 parts of acetone was added 14 parts of potassium thiocyanate. The mixture was refluxed for two hours with stirring, the potassium chloride was filtered This copolymer was converted to an insoluble, infusible condition by molding it at 185° C., crosslinking of adjacent copolymer chains taking place through condensation reactions involving the elimination of water or formaldehyde from methanol groups. Polystyrene, of course, is a permanently soluble, fusible material. The Shore D hardness of this new heat-converted copolymer was 90, and that of polystyrene was 86. It is evident that the new copolymer is significantly harder than polystyrene, which is one of the hardest of known thermoplastic resins.

Example 11

The copolymer of Example 10 (10 parts) was dissolved in a mixture of 40 parts of dioxane and 4 parts of 2-methoxyethanol. Four films of this solution were poured on glass plates, allowed to dry in air, and then heated in air as shown.

| Film | Heating Time and Temperature | Physical Appearance After Heating | Solubility in Dioxane After Heating |
|---|---|---|---|
| 1 | None | Water Clear | (Easily soluble.) |
| 2 | 30 min. at 170° C | do | Almost insoluble. |
| 3 | 60 min. at 170° C | do | Insoluble. |
| 4 | 1,050 min. at 170° C | Slightly Yellow | Do. |

Film #1 cracked and peeled from the glass within a few hours at room temperature. The heated films adhered well to the glass. It is apparent that this copolymer can be converted into a valuable, insoluble varnish film by a short baking operation at a sufficiently high temperature. When similar films were baked for 1–17 hours at 140° C. they remained soluble in dioxane.

Example 12

A solution of 12.7 parts of N-methylolmaleimide, 8.6 parts of vinyl acetate and 0.01 part of benzoyl peroxide in 62 parts of dioxane was warmed on the steam bath for a few hours with intermittent addition of more benzoyl peroxide until a total of 0.05 part had been added. The copolymer, purified as in Example 9, was a white resin suitable for making cast articles and varnishes. It is soluble in acetone and dioxane. Conversion, 67%.

*Analysis.*—Found: Nitrogen, 7.19%; [η] in dimethylformamide, 0.17.

The nitrogen content shows that the copolymer contains 56 mol-percent of N-methylolmaleimide units.

Example 13

A solution of 5.5 parts of 2-ethylhexyl acrylate, 3.8 parts of N-methylolmaleimide and 0.036 part of benzoyl peroxide in 21 parts of dioxane was kept at room temperature overnight. Then more benzoyl peroxide (0.036 part) was added, the solution was heated for two hours at 70–75° C., and poured into water. The precipitate was washed thoroughly with water and dried, leaving 8.4 parts (89% conversion) of a white, powdery copolymer.

Example 14

A solution of 3.0 parts of vinyl n-butyl ether, 3.8 parts of N-methylolmaleimide and 0.036 part of benzoyl peroxide in dioxane was treated in the way described in Example 12 (including the additional benzoyl peroxide). The copolymer, a powder, was formed in 96% conversion (6.5 parts).

Example 15

A solution of 5.0 parts of N-methylolmaleimide, 20 parts of vinyl chloride and 0.5 part of benzoyl chloride in 25 parts of acetone was heated in a closed container for 16 hours at 80° C. The solution was poured into methanol, precipitating the copolymer as a grey powder in 69% conversion (17.3 parts).

*Analysis.*—Found: Chlorine, 40.7%; nitrogen, 2.61%, 2.64%.

Examples 16, 17, 18, 19

Copolymers of N-methylolmaleimide were made with each of the monomers acrylonitrile, methyl methacrylate, n-butyl acrylate and alpha-methylstyrene by dissolving equimolar amounts of each pair of monomers in a solution of 0.50 part of benzoyl peroxide in 10 parts of dioxane, the total amount of the monomers being 10 parts in each solution. These solutions were heated in closed containers at 60° C. for the times shown. Then the viscous solutions or, in some cases, jelly-like solids were dissolved in acetone and precipitated with Skellysolve B. The precipitated copolymers were dried in vacuo, weighed, and analyzed for nitrogen.

| Example | Amounts Reacted N-Methylolmaleimide | Amounts Reacted Second Monomer | Second Monomer | Heating Time (Hrs.) | Conversion (Percent) | Nitrogen (Percent) |
|---|---|---|---|---|---|---|
| 16 | 7.06 | 2.94 | Acrylonitrile | 1.75 | 68 | |
| 17 | 4.98 | 5.02 | n-Butyl acrylate. | 0.6 | 79 | 5.23 |
| 18 | 5.59 | 4.41 | Methyl methacrylate. | 0.75 | 29 | 5.26 |
| 19 | 5.18 | 4.82 | alpha-Methylstyrene. | 4.25 | 76 | 5.30 |

These copolymers were hard, tough, white, horny materials suitable for making cast resins and varnishes. The copolymer made from methyl methacrylate (Example 18) was dissolved in acetone and poured onto glass. The film dried tackfree within one minute. It was then baked for two hours at 120° C. to form a clear, water-white varnish film which is softened only slightly by acetone.

Example 20

A mixture of 40 parts of isobutylene, 10 parts of N-methylolmaleimide, 1 part of benzoyl peroxide and 50 parts of acetone was heated in a sealed container at 70° C. for 17 hours. The sticky crude copolymer so formed was washed with methanol and dried in vacuo, leaving 13.9 parts (28% conversion) of a resinous, white, extremely tough copolymer which is soluble in dioxane, but insoluble in water, methanol, acetone, toluene, and chloroform. This copolymer is suitable for making varnishes.

*Analysis.*—Nitrogen: 7.36, 7.18%; [η] in dioxane, 0.52.

Example 21

A mixture of 80 parts of allyl acetate, 20 parts of N-methylolmaleimide, 2 parts of benzoyl peroxide and 100 parts of acetone was heated under a reflux condenser at the boiling point of the solution (69° C.) for 17 hours. At the end of this time a clear glass-like solid had separated from the solution. The entire mixture was diluted with methanol, and the insoluble fraction was dried in vacuo, leaving 24.2 parts of the light tan brittle copolymer; [η] in dimethylformamide, 0.12.

*Analysis.*—Nitrogen: 6.79, 6.72%.

Example 22

A mixture of 20 parts of freshly distilled octene-1, 20 parts of N-methylolmaleimide, 0.8 part of benzoyl peroxide and 40 parts of acetone was heated at 68–72° C. for 90 minutes, causing an oil to separate. The entire mixture was poured into methanol, precipitating an oily solid which was re-dissolved in dioxane and reprecipitated with methanol. The white solid copolymer was dried in high vacuo overnight at 70° C. Conversion, 13% (5.1 parts); nitrogen, 9.16%; [η] in dimethylformamide, 0.33.

Examples 23–42

Each of the following copolymers was made by heating a mixture of a given maleimidomethyl compound off and the filtrate was concentrated and cooled. The maleimidomethyl thiocyanate, which crystallized in the form of white needles, was filtered and dried. Yield, 39% of theory (9 parts); melting point after recrystallization from aqueous acetone, 107–108° C.

Analysis.—Calcd. for $C_6H_4O_2N_2S$: Sulfur, 19.04%. Found: Sulfur, 19.17%.

This new compound can be copolymerized, as shown in Examples 35, 36 and 43, to form useful new resins.

Example 2

A solution of 41.7 parts of phenyl isocyanate in 45 parts of benzene (dried over sodium and decanted therefrom) was added gradually to a solution of 50 parts of N-methylolmaleimide in 265 parts of refluxing benzene. The solution was boiled for a short additional period and then left overnight at room temperature, causing part of the product to separate as a red oil which partially crystallized on longer standing. Most of the product was isolated by decanting the benzene-rich fraction from the red oil, followed by evaporation of most of the benzene. The product, maleimidomethyl N-phenylcarbamate, was a white solid melting at 167.0–167.5° C. after recrystallization from methanol. Yield, 19.6 parts, or 23% of theory.

Analysis.—Calcd. for $C_{12}H_{10}O_4N_2$: Nitrogen, 11.4%. Found: Nitrogen, 11.0%, 11.2%.

This new compound can be polymerized, as shown in Example 41 to form useful new resins.

Example 3

A solution of 7.3 parts of aniline and 10 parts of N-methylolmaleimide in 26 parts of dry, peroxide-free p-dioxane was refluxed for several hours. The solution was then cooled and concentrated, causing the product, N-(maleimidomethyl) aniline, to crystallize in the form of bright yellow needles. After recrystallization from aqueous acetone it melted at 127.5–128.5° C. Yield, 14 parts, or 88% of theory.

Analysis.—Calcd. for $C_{11}H_{10}N_2O_2$: Nitrogen, 13.8%; molecular weight, 202. Found: Nitrogen, 13.5%; molecular weight, 192.

This new compound can be polymerized, as shown in Example 38, to form useful new resins.

Example 4

Piperidylmethyl ethyl ether (7.2 parts) was gradually poured into 4.8 parts of maleimide, causing evolution of heat and the formation of a yellow color. After the exothermic reaction had ended the mixture was heated gently until it formed a homogeneous solution, which almost entirely solidified as a mass of yellow needles on cooling to room temperature. The product was washed with ethyl alcohol, and then recrystallized from a mixture of benzene and Skellysolve B, a petroleum cut which is largely n-hexane. The yield of N-(maleimidomethyl)-piperidine was 82% of theory (8.0 parts of yellow needles); melting point, 103.0–104.5° C.

Analysis.—Calcd. for $C_{10}H_{14}O_2N_2$: Carbon, 61.83%; hydrogen, 7.26%; nitrogen, 14.45%. Found: Carbon, 62.05%; hydrogen, 7.04%; nitrogen, 14.40%, 14.56%.

This new compound can be polymerized, as shown in Example 40, to form useful new resins.

Example 5

Diethylaminomethyl ethyl ether (22.6 parts) and maleimide (16.5 parts) were reacted by the method of Example 4. The mixture, which remained liquid on cooling to room temperature, was fractionally distilled in vacuo. The yield of N-(maleimidomethyl)diethylamine was 72% of theory (22.4 parts of a yellow oil); boiling point, 51–54° C. at 0.03 mm. Hg.

Analysis.—Calcd. for $C_9H_{14}O_2N_2$: Nitrogen, 15.3%. Found: Nitrogen, 15.15%, 15.16%.

Example 6

Di-n-butylaminomethyl ethyl ether[1] (20 parts) and maleimide (10.2 parts) were reacted by the method of Example 4. The mixture, which remained liquid on cooling to room temperature, was fractionally distilled in vacuo. The yield of N-(maleimidomethyl) di-n-butylamine was 87% of theory (22.0 parts of a yellow oil); boiling point, 76.0–77.5° C. at 0.05 mm. of Hg; $n_D^{20}$, 1.4777.

Analysis.—Calcd. for $C_{13}H_{22}O_2N_2$: Nitrogen, 11.7%. Found: Nitrogen, 11.48%, 11.42%.

This new maleimidomethyl compound can be polymerized, as shown in Example 39, to form useful new resins.

Example 7

To 12.7 parts of N-methylolmaleimide in 75 parts of boiling purified dioxane there was added gradually 12.9 parts of di-n-butylamine. As rapidly as water was formed in the reaction it was removed as an azeotrope with dioxane, by means of a good fractionating column. When the evolution of water had ended the anhydrous residual solution was concentrated in vacuo. Fractional distillation of the residue yielded 17.7 parts (74% of theory) of N-(maleimidomethyl) di-n-butylamine; boiling point, 66–69.2° C. at 0.02 mm. Hg; $n_D^{20}$, 1.4789.

The following examples illustrate the preparation and properties of typical polymers of my invention.

Example 8

Benzoyl peroxide (0.1 part) was added to a solution of 10 parts of N-methylolmaleimide in 30 parts of acetone at 60° C. Within 5 minutes at that temperature polymeric material began separating from solution. At the end of an hour at 58–62° C. the mixture was poured into methanol. The polymer of N-methylolmaleimide was filtered and dried in vacuo at 70° C. Yield, 6.8 parts (68% conversion) of a white powder; intrinsic viscosity [η] in dimethylformamide, 0.37.

Analysis.—Calcd. for $(C_5H_5NO_3)_x$: Nitrogen, 11.0%. Found: Nitrogen, 10.8%.

This resin may be used as a molding powder.

Example 9

A solution of 12.7 parts of N-methylolmaleimide and 10.4 parts of styrene in 67 parts of dioxane was heated on the steam bath. Copolymerization began even before a catalyst was added. When the vigorous reaction had subsided, about 0.5% (based on the total initial weight of monomers) of benzoyl peroxide was added, and the solution was heated, on the steam bath, until it became very viscous. It was then poured into methanol to precipitate the copolymer. This was then redissolved and reprecipitated twice more, using dioxane and methanol as solvent and precipitant, respectively. The copolymer, after drying in vacuo at 70–80° C., was obtained in 97% conversion (22.3 parts).

Analysis.—Found: Nitrogen, 5.22 and 5.02%; [η] in dioxane, 0.6.

The nitrogen analysis shows that the copolymer contains 42 mol-percent of N-methylolmaleimide units.

Example 10

A solution of 20 parts of N-methylolmaleimide, 80 parts of styrene, and 2 parts of benzoyl peroxide in 200 parts of dioxane was heated at 65–70° C. for a short time. Then the viscous solution was poured slowly into rapidly stirred methanol to precipitate the copolymer, which was then dried to constant weight in high vacuo. Conversion, 41%. It is a brittle white solid which is soluble in dioxane.

Analysis.—Found: Nitrogen, 4.53%.

---

[1] This ether was made by the process of McLeod and Robinson, J. Chem. Soc. 119, 1470 (1921), in 60% yield, boiling point 108–115° C. at 37 mm. Hg.

(A) with a comonomer (B) in the presence of 2 parts of benzoyl peroxide, except as noted, and 100 parts of acetone, except as shown, per 100 parts of the mixture of the two monomers for several hours at about 70° C. with stirring. The solutions, which were very viscous at room temperature, were poured into rapidly stirred methanol in order to precipitate the copolymers. Each copolymer was filtered and dried at a pressure of 0.1 mm. of Hg until it had come to constant weight. Each copolymer is a white powder, except as noted. The intrinsic viscosity was measured in dimethylformamide, unless noted otherwise.

the molar feed ratio be held constant. Likewise, the molecular weight of the polymer varies with X and Y.

Having thus described my invention, what I claim and desire to protect by Letters Patent is:

1. A resinous polymerizate chemical having the formula

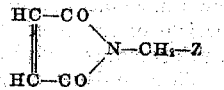

where Z is a radical selected from the class consisting of hydroxyl, chlorine, bromine, thiocyano,

O—CO—NH—R′

| Example | (A) X or Y | (B) Comonomer | (A)/(B) Feed ratio (percent) | Copolymer | | |
|---|---|---|---|---|---|---|
| | | | | Conversion (percent) | [η] | Nitrogen (percent) |
| 23 a | —OH | Styrene | 10:90 | 98 | b 0.25 | 1.08 |
| 24 a | —OH | ___do___ | 5:95 | 87 | b 0.21 | 0.62 |
| 25 | —OH | Vinyl acetate | 20:80 | 38 | 0.62 | 5.84 |
| 26 | —OH | Isopropenyl acetate | 20:80 | 19 | 0.33 | 6.09 |
| 27 | —OH | 2-Methyl-5-vinylpyridine | 20:80 | c 42 | 0.17 | (c) |
| 28 | —OH | Vinylidene chloride | 20:80 | 10 | 0.43 | d 1.29 |
| 29 | —OH | Acrylonitrile | 30:70 | 65 | 1.45 | 21.83 |
| 30 | —OH | Methyl vinyl ketone | 20:80 | 42 | b 0.47 | 1.25 |
| 31 | —Cl | Styrene | 50:50 | 32 | 0.22 | e 5.54 |
| 32 | —Cl | ___do___ | 10:90 | 27 | 0.60 | f 3.37 |
| 33 | —Cl | Vinyl chloride | 20:80 | 5 | 0.08 | g 6.43 |
| 34 | —Cl | Acrylonitrile i | 25:75 | 33 | 0.43 | 22.74 |
| 35 | —SCN | Acrylonitrile | 20:80 | 60 | 1.67 | (h) |
| 36 | —SCN | 2-Methyl-5-vinylpyridine | 10:90 | 15 | (i) | k 9.70 |
| 37 | —OH | Methyl methacrylate | 20:80 | 37 | 0.70 | 1.39 |
| 38 | —NH-C₆H₅ | Styrene | 20:80 | 32 | (m) | 7.45 |
| 39 | —N(n-C₄H₉)₂ | ___do___ | 20:80 | 53 | 0.20 | 1.39 |
| 40 | —NC₅H₁₀ n | ___do___ | 20:80 | 68 | 0.51 | 4.18 |
| 41 | —C-NH-C₆H₅ ‖ O | ___do___ | 20:80 | 34 | 0.80 | 6.76 |
| 42 | —OH | Diethyl fumarate | 50:50 | 9 | 0.13 | 9.02 | a Polymerization was run in dioxane.
b In dioxane.
c Brittle, light tan solid containing 65.3% carbon and 6.24% hydrogen.
d Also contains 63.09% chlorine.
e Also contains 13.80% chlorine.
f Also contains 8.30% chlorine.
g Also contains 31.44% chlorine.
h Contains 2.64% sulfur.
i Copolymerized with Porofor N.
j Brown solid insoluble in ordinary solvents.
k Sulfur.
m Dark red solid insoluble in ordinary solvents.
n Preparation shown in Example 4.

*Example 43*

A mixture of 10 parts of maleimidomethyl thiocyanate, 30 parts of vinyl chloride, 0.8 part of Porofor N, and 80 parts of acetone was heated at 50° C. for 16 hours, with shaking, in a steel autoclave. After the mixture had cooled, the excess vinyl chloride was allowed to escape. The solid copolymer was separated from the acetone solution by filtration, and was then washed with methanol and dried in vacuo. The copolymer, a while powder, is soluble in dimethyl formamide and pyridine, and insoluble in most of the usual organic solvents; conversion 35%; [η] in dimethyl formamide 0.69; nitrogen 11.08%; sulfur 10.42%; chlorine 4.23%; carbon 43.21%; hydrogen 3.70%.

These new resins may be used as molding powders and/or varnishes, especially when the polymerization is interrupted before crosslinking and insolubilization has occurred.

It is evident that polymeric materials of wide differing nature and uses can be made in the operation of my invention, by changing the nature of the group X or Y attached to the maleimidomethyl group, by changing the comonomer, by using two or more comonomers, by changing the proportions of the various reagents, or by changing the reaction conditions. The nature of the group X or Y will affect the extent and the course of polymerization. The proportions of the maleimidomethyl compound and any particular comonomer to be found in the copolymer varies as X or Y is varied, even though the molar feed ratio be held constant. Likewise, the molecular weight of the polymer varies with X and Y.

and alkylamino substituents, R′ representing a radical from the group consisting of hydrogen, alkyl, and aryl.

2. A heteropolymerizate of a mixture of monomers, composed of at least one monomeric ethylenic compound having at least one terminal CH₂=C< group which is non-conjugated with respect to any other such group, and at least one monomeric maleimidomethyl compound copolymerizable therewith which latter compound has the formula

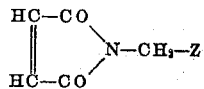

where Z is a radical selected from the class consisting of hydroxyl, chlorine, bromine, thiocyano,

O—CO—NH—R′ and alkylamino substituents, R′ representing a radical from the group consisting of hydrogen, alkyl, and aryl.

3. A heteropolymerizate of a mixture of monomers, composed of at least one monomeric ethylenic compound having at least one terminal CH₂=C< group which is non-conjugated with respect to any other such group, and at least one monomeric maleimidomethyl compound copolymerizable therewith which latter compound has the formula

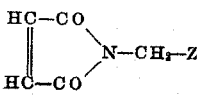

where Z is a radical selected from the class consisting of hydroxyl, chlorine, bromine, thiocyano,

O—CO—NH—R' and alkylamino substitutents, R' representing a radical from the group consisting of hydrogen, alkyl, and aryl, the maleimidomethyl monomer constituent constituting at least 5% of the weight of combined monomers.

4. A process which comprises polymerizing, in the presence of a free radical initiator of polymerization, an ethylenic compound having at least one terminal $CH_2=CH<$ group which is non-conjugated with respect to any other such group, and a monomeric maleimidomethyl compound of the class defined in claim 2.

5. A resinous heteropolymer of N-methylolmaleimide and a monomeric monovinyl compound.

6. A resinous polymerizate of methylolmaleimide.

7. A heteropolymerizate of at least one monomeric ethylenic compound having at least one terminal $CH_2=C<$ group which is non-conjugated with respect to any other such group, and monomeric methylolmaleimide.

References Cited in the file of this patent

UNITED STATES PATENTS

| 2,271,122 | Harmon | Jan. 27, 1942 |
| 2,384,239 | Dorough | Sept. 4, 1945 |
| 2,526,517 | Tawney | Oct. 17, 1950 |
| 2,640,832 | Tawney | June 2, 1953 |

FOREIGN PATENTS

| 708,131 | Germany | July 12, 1941 |

OTHER REFERENCES

Karrer: Organic Chemistry, 2nd English edition (Elsever, 1946), pages 123 and 453.

J. of Polymer Science, vol. VIII, No. 3, pages 257–259.